United States Patent
Ichikawa

(10) Patent No.: US 11,284,490 B2
(45) Date of Patent: Mar. 22, 2022

(54) PROXIMITY DETECTION DEVICE

(71) Applicant: ALPINE ELECTRONICS, INC., Tokyo (JP)

(72) Inventor: Teiichi Ichikawa, Iwaki Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/951,094

(22) Filed: Nov. 18, 2020

(65) Prior Publication Data
US 2021/0227665 A1 Jul. 22, 2021

(30) Foreign Application Priority Data
Jan. 16, 2020 (JP) .............................. JP2020-005515

(51) Int. Cl.
| | | |
|---|---|---|
| H05B 45/00 | (2022.01) | |
| H05B 45/40 | (2020.01) | |
| H05B 45/37 | (2020.01) | |
| H05B 45/10 | (2020.01) | |
| F21Y 115/10 | (2016.01) | |

(52) U.S. Cl.
CPC ............ *H05B 45/40* (2020.01); *H05B 45/10* (2020.01); *H05B 45/37* (2020.01); *F21Y 2115/10* (2016.08)

(58) Field of Classification Search
CPC ....... G06F 3/0421; H05B 45/40; H05B 45/37; H05B 45/10
See application file for complete search history.

(56) References Cited

U.S. PATENT DOCUMENTS

| | | | |
|---|---|---|---|
| 2010/0150399 A1 | 6/2010 | Svajda et al. | |
| 2010/0321309 A1* | 12/2010 | Lee | G06F 3/0421 345/173 |
| 2012/0312956 A1* | 12/2012 | Chang | G06F 3/017 250/201.1 |
| 2013/0027354 A1* | 1/2013 | Yabuta | G09G 3/3406 345/175 |
| 2013/0207936 A1* | 8/2013 | Theimer | G06F 3/0421 345/175 |

(Continued)

FOREIGN PATENT DOCUMENTS

JP 2019-074465 5/2019

OTHER PUBLICATIONS

Extended European Search Report for 21150063.2 dated Jun. 11, 2021, 8 pgs.

*Primary Examiner* — Gerald J Sufleta, II
(74) *Attorney, Agent, or Firm* — Crowell & Moring LLP

(57) ABSTRACT

A plurality of infrared LEDs, e.g., four, and a plurality of photodiodes, e.g., two, are arranged side by side in interleaved fashion in the order of an LED1, a PD1, an LED2, an LED3, a PD2, and an LED4, and are arranged slightly outside a side of the display surface. A threshold value Th is set so as to become small as $\max(E_i)/\max(A_j)$ calculated from a detection signal of the PD1 when the LED1 emits light, a detection signal of the PD1 when the LED2 emits light, a detection signal of the PD2 when the LED3 emits light, a detection signal of the PD2 when the LED4 emits light, a detection signal of the PD2 when the LED1 emits light, and a detection signal of the PD1 when the LED4 emits light, and the approach of the hand of the user is detected when $\max(A_j)$ exceeds the threshold value.

13 Claims, 8 Drawing Sheets

(56) References Cited

U.S. PATENT DOCUMENTS

| | | | |
|---|---|---|---|
| 2014/0077084 A1* | 3/2014 | Ebisumoto | H04N 5/378 |
| | | | 250/353 |
| 2015/0103051 A1* | 4/2015 | Wyrwas | G06F 3/0421 |
| | | | 345/175 |
| 2015/0234539 A1* | 8/2015 | Hou | G06F 3/0421 |
| | | | 345/175 |
| 2015/0309164 A1 | 10/2015 | Cho et al. | |
| 2017/0061903 A1* | 3/2017 | Yata | G09G 3/3413 |
| 2018/0217670 A1 | 8/2018 | Cho et al. | |
| 2020/0300987 A1* | 9/2020 | Ta | G01S 17/10 |
| 2020/0387261 A1* | 12/2020 | Suzuki | G06K 9/0004 |

\* cited by examiner

FIG. 6A1
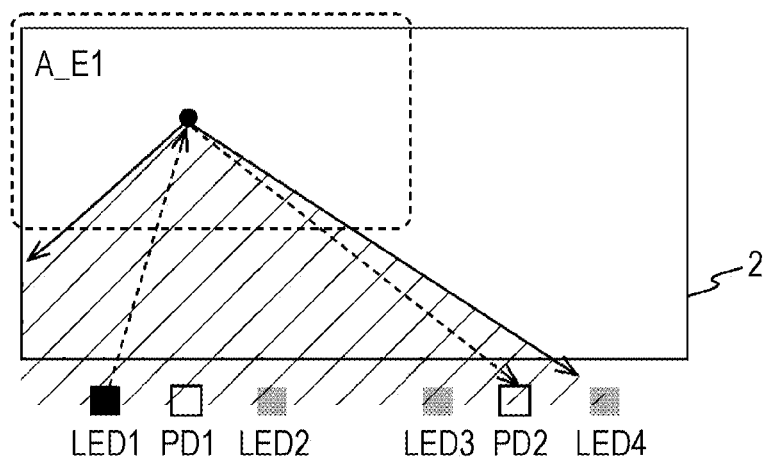
FIG. 6A2
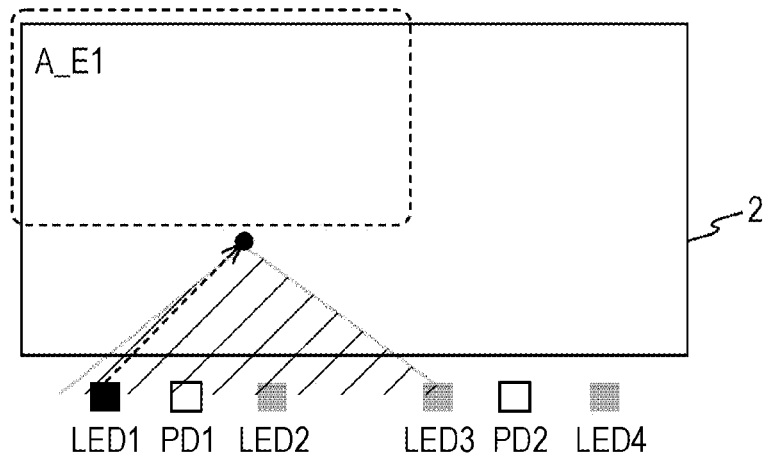
FIG. 6B
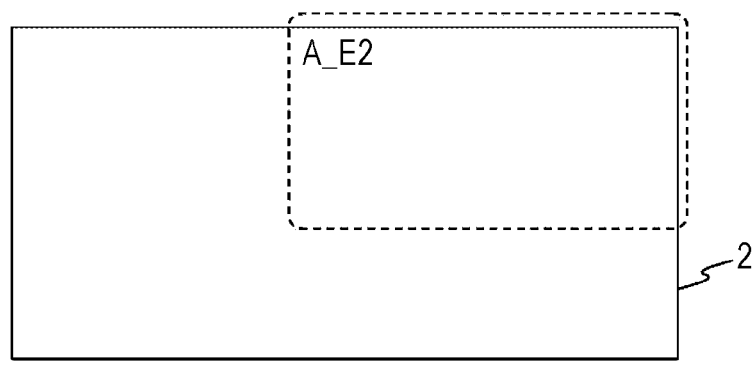

PROXIMITY DETECTION DEVICE

RELATED APPLICATION

The present application claims priority to Japanese Patent Application Number 2020-005515, filed Jan. 16, 2020, the entirety of which is hereby incorporated by reference.

BACKGROUND

1. Field of the Invention

The present invention relates to a technology of detecting the approach of a hand of a user to a display surface of a display.

2. Description of the Related Art

A technology of detecting the approach of a hand of a user to a display surface of a display by irradiating a front side of the display surface of the display with infrared light from several infrared LEDs arranged along a lower side of the display surface of the display below the lower side and detecting reflection light of the infrared light due to the hand of the user by photodiodes has been known (for example, JP 2019-74465A).

In general, since the infrared LED has directivity, when a direction viewed from the infrared LED is a direction in which an angle with respect to a central axis of a directional angle becomes larger, the intensity of infrared light becomes weaker. Accordingly, in the above-mentioned technology of detecting the approach of the hand of the user to the display surface of the display by providing several infrared LEDs below the lower side of the display, a region in which the irradiation intensity of the infrared light is weaker than in another region is formed below the display positioned close to the infrared LED in the direction of the central axis of the directional angle of the infrared LED, and thus, the detection of the approach of the hand of the user to this region may not be satisfactorily performed.

Such a problem can be solved when a plurality of infrared LEDs is arranged at narrow intervals such that a region in which the irradiation intensity of the infrared light is weak is not formed. However, in this case, cost increases as the required number of infrared LEDs increases.

SUMMARY

Therefore, an object of the present disclosure is to satisfactorily detect the approach of the hand of the user in the entire region of the display surface of the display while using a relatively small number of infrared LEDs.

In order to achieve the object, the present disclosure describes a proximity detection device that detects the approach of a user to a display surface of a display. The proximity detection device includes a plurality of infrared light sources that is arranged along a first side which is one side of the display surface outside the display surface of the display and emits infrared light passing through in front of the display surface, a plurality of photodetectors that is arranged along the first side outside the display surface, a proximity detection unit configured to detect the approach of the user to the display surface with a set sensitivity by using a first detection reflection intensity which is an intensity of reflection light of the infrared light emitted by each infrared light source and is detected by the photodetector positioned relatively close to the infrared light source that emits the infrared light, and a sensitivity setting unit configured to set, when only one infrared light source emits the infrared light, a sensitivity to the proximity detection unit such that the sensitivity becomes high in a case where the intensity of the reflection light detected by the photodetector positioned relatively far from the infrared light source and the first detection reflection intensity indicate that there is a high probability that reflection occurs in a region close to the first side in front of the display surface compared to a case where the intensities do not indicate that there is a high probability that the reflection occurs in the region.

In order to achieve the object, the present disclosure describes a proximity detection device that detects the approach of a user to a display surface of a display. The proximity detection device includes a plurality of infrared light sources that is arranged along a first side which is one side of the display surface outside of the display surface of the display, and emits infrared light passing through in front of the display surface, a plurality of photodetectors that is arranged along the first side outside the display surface, a proximity detection unit configured to detect the approach of the user to the display surface when an intensity which is detected by the photodetector corresponding to the infrared light source according to a predetermined correspondence and is an intensity of reflection light of the infrared light emitted by the infrared light source is used as a first detection reflection intensity of emission light of the infrared light source for each of the plurality of infrared light sources and the intensity of the reflection light of the infrared light indicated by the first detection reflection intensity of the emission light of each infrared light source exceeds a set threshold value, and a threshold value setting unit configured to set a threshold value to the proximity detection unit such that the threshold value changes depending on an evaluation value calculated according to a predetermined evaluation function from each second detection reflection intensity and each first detection reflection intensity by using, as target infrared light sources, one or a plurality of infrared light sources of the plurality of infrared light sources and using, as second detection reflection intensities of emission light of the target infrared light sources, intensities which are intensities of reflection light of infrared light emitted by the target infrared light sources and are detected by the photodetectors further from the target infrared light sources than the photodetectors corresponding to the infrared light sources which are the target infrared light sources according to the correspondence for each target infrared light sources.

Here, in the proximity detection device, the threshold value setting unit may be configured to calculate, as the evaluation value, a ratio of a maximum value of each second detection reflection intensity to a maximum value of each first detection reflection intensity, and set the threshold value to the proximity detection unit such that the threshold value becomes small in a case where the calculated evaluation value is smaller than a predetermined level compared to a case where the evaluation value is not smaller than the predetermined level.

In the proximity detection device, the threshold value setting unit may be configured to calculate, as the evaluation value, a ratio of a maximum value of each second detection reflection intensity to a maximum value of each first detection reflection intensity, and set the threshold value to the proximity detection unit such that the threshold value becomes small as the calculated evaluation value becomes small.

In the proximity detection device, the proximity detection unit may be configured to detect the approach of the user to the display surface when the maximum value of each first detection reflection intensity exceeds the set threshold value.

According to the proximity detection device described above, since it is detected whether or not the reflection occurs in the region close to the side of the display in which the irradiation intensity of the infrared light becomes weak and the infrared light source is arranged and the detection sensitivity of the hand of the user is increased when the reflection occurs in this region, the approach of the hand of the user to the display surface of the display can be detected in a form in which the detection sensitivity of the approach of the user is increased only in this region.

Accordingly, the approach of the hand of the user can be satisfactorily detected in the entire region of the display surface of the display. Here, the present disclosure also provides the proximity detection device and a display unit including the display integrated with the proximity detection device. The present disclosure also provides an information processing system that includes the proximity detection device, the display, and a data processing device using the display for display output, and notifies the data processing device of the approach of the user to the display surface when the proximity detection device detects the approach.

As described above, according to the present disclosure, the approach of the hand of the user can be satisfactorily detected in the entire region of the display surface of the display while using a relatively small number of infrared LEDs.

BRIEF DESCRIPTION OF THE DRAWINGS

FIGS. 6A1 to 6B are diagrams illustrating a principle of region detection of the proximity detection sensor according to the embodiment of the present invention;

DETAILED DESCRIPTION OF THE PREFERRED EMBODIMENTS

Figure 1:
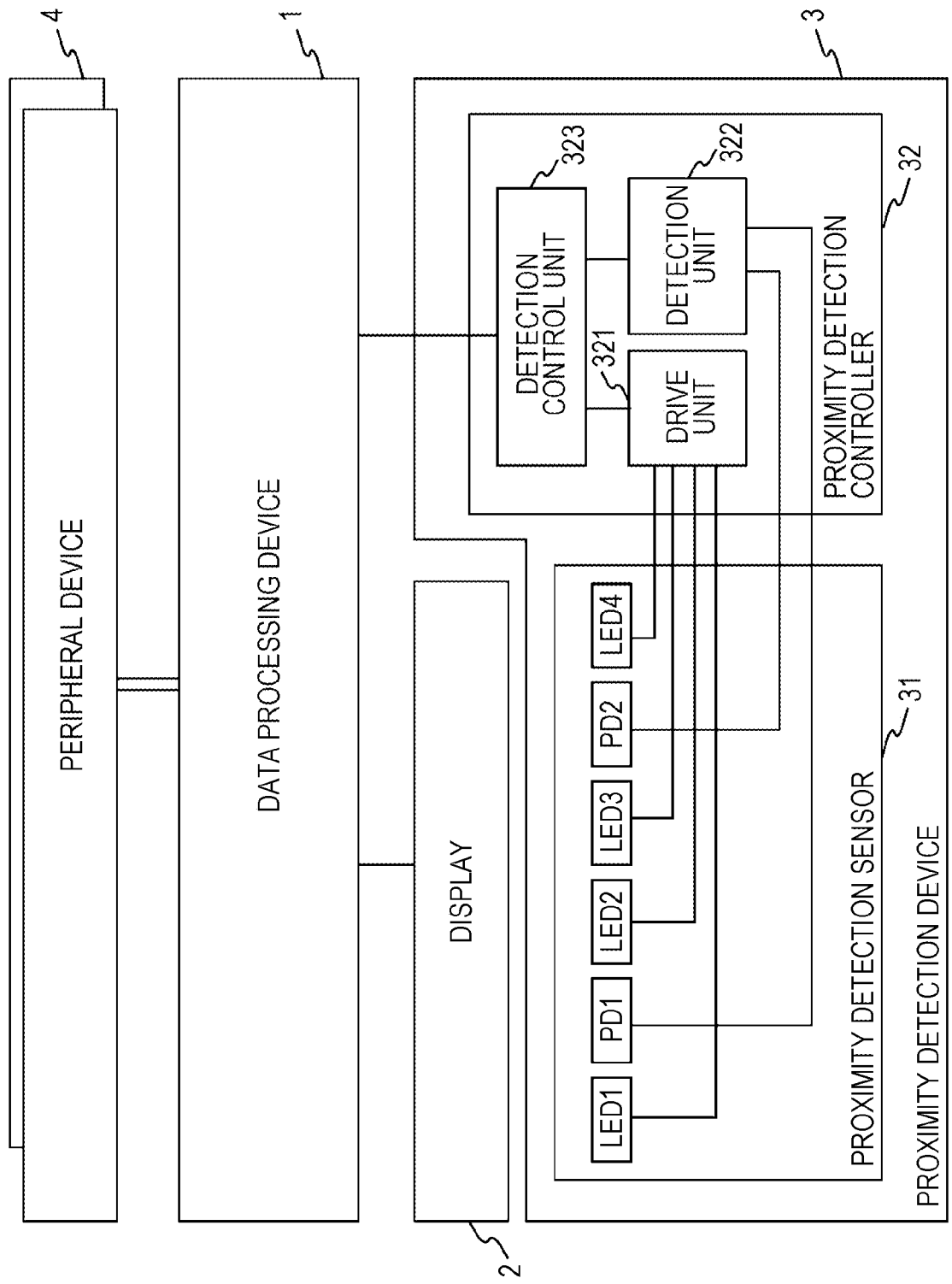
FIG. 1 is a block diagram illustrating a configuration of an information processing system according to an embodiment of the present invention.

Hereinafter, an embodiment of the present invention will be described. FIG. 1 illustrates a configuration of an information processing system according to the present embodiment. The information processing system is a system mounted on a vehicle, and includes a data processing device 1 that executes a car navigation application, a media player application, and the like, a display 2 that is used for video display by the data processing device 1, a proximity detection device 3, and other peripheral devices 4 used by the data processing device 1.

Figure 2:
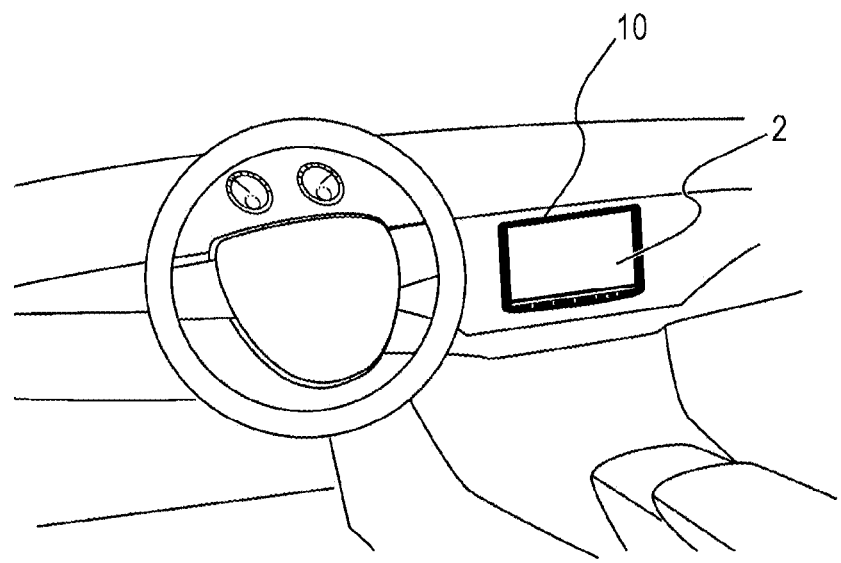
FIG. 2 is a diagram illustrating an arrangement of a display according to the embodiment of the present invention.

As illustrated in FIG. 2, the display 2 and the proximity detection device 3 are arranged in the form of an integrated display unit 10 such that a display surface is directed rearward at a position between a driver's seat and a passenger's seat in a dashboard of the vehicle.

Returning back to FIG. 1, the proximity detection device 3 includes a proximity detection sensor 31 and a proximity detection controller 32. The proximity detection sensor 31 includes four infrared LEDs of an LED 1, an LED 2, an LED 3, and an LED 4, and two photodiodes of a PD 1 and a PD 2 that detect infrared light. The proximity detection controller 32 includes a drive unit 321 that causes the LED 1, the LED 2, the LED 3, and the LED 4 to emit light by driving these LEDs, a detection unit 322 that converts current signals output by the PD 1 and the PD 2 into intensity signals indicating intensities of the infrared light incident on the PD 1 and the PD 2, and a detection control unit 323 that controls operations of the drive unit 321 and the detection unit 322, detects the approach of a hand of a user to the display surface of the display 2 by the intensities of the infrared light indicated by the signals converted by the detection unit 322, and notifies the data processing device 1 of the detected approach.

Figure 3B:
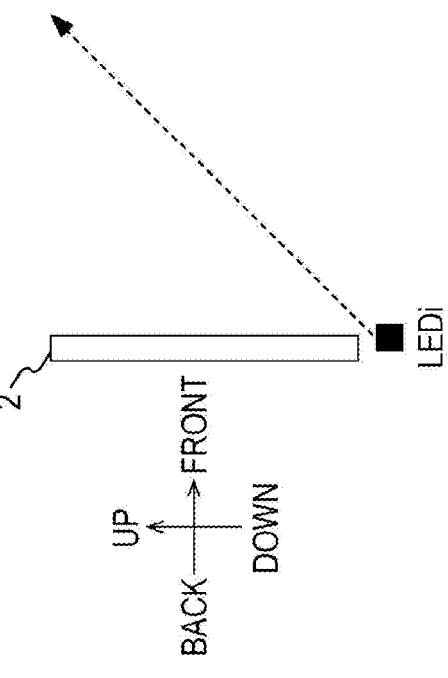
FIGS. 3A to 3C are diagrams illustrating an arrangement of a plurality of proximity detection sensors according to the embodiment of the present invention.
Figure 3A:
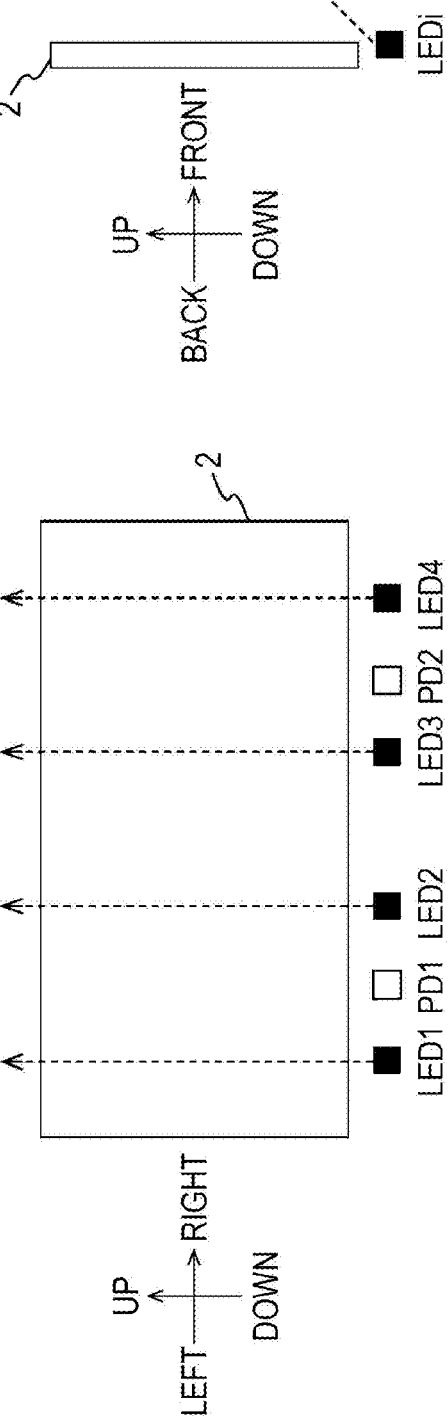

Next, assuming that a left-right direction, an up-down direction, and a front-back direction are determined with respect to the display 2 as illustrated in FIGS. 3A and 3B, the LED 1, the LED 2, the LED 3, and the LED 4 are arranged in this order from left to right at a position slightly below a lower side of the display 2 at approximately equal intervals. A front direction is a display direction of the display 2. The PD 1 is arranged at an intermediate position between the LED 1 and the LED 2, and the PD 2 is arranged at an intermediate position between the LED 3 and the LED 4. Thus, each PD converts reflection light of the infrared light incident on the PDs into current signals.

Arrows in FIGS. 3A and 3B represent central axes of directional angles of the LED 1, the LED 2, the LED 3, and the LED 4, and the LED 1, the LED 2, the LED 3, and the LED 4 diagonally irradiates a front upper side of the display 2 with the infrared light.

Figure 3C:
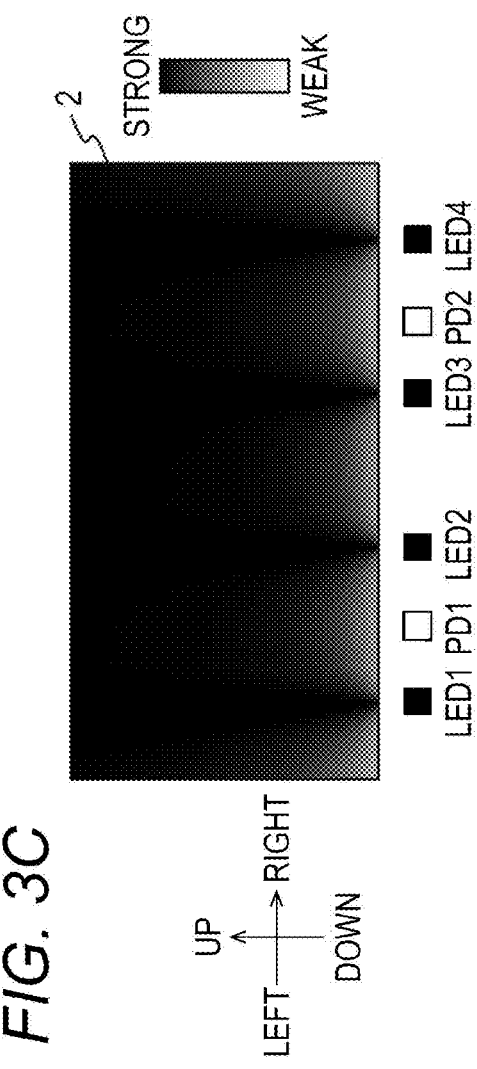

FIG. 3C illustrates a distribution of the irradiation intensities of the infrared light emitted by the LED 1, the LED 2, the LED 3, and the LED 4 viewed in the front-back direction. Since a direction in which an angle with respect to the central axis becomes large is taken even as viewed from any of the LEDs, a region in which the irradiation intensities become weak is formed at a lower portion of the display 2.

Figure 4A:
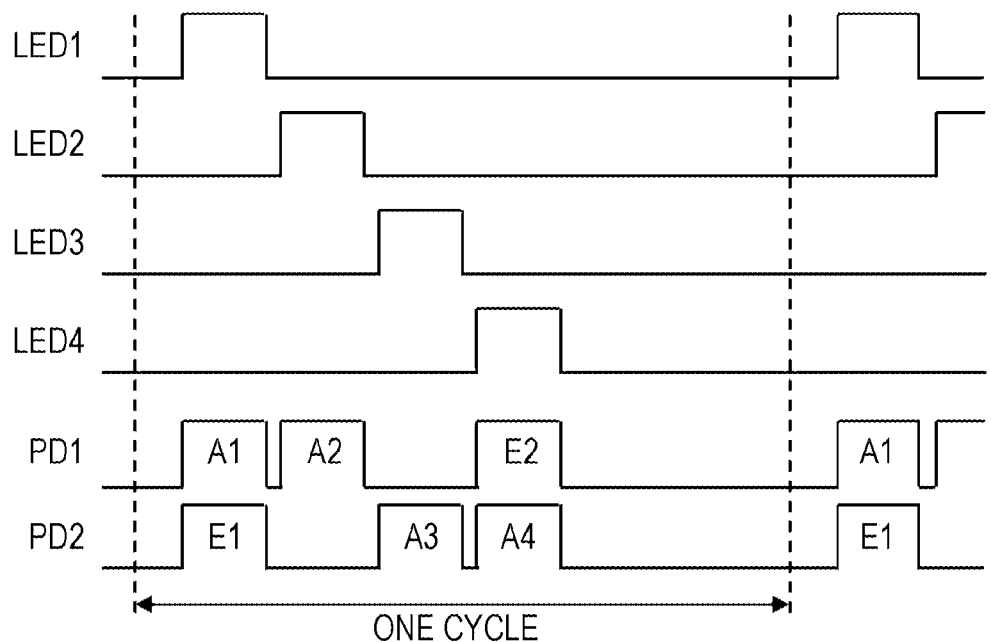
FIGS. 4A and 4B are diagrams illustrating an operation sequence of the proximity detection sensor according to the embodiment of the present invention.

Next, the detection control unit 323 of the proximity detection controller 32 controls the operations of the drive unit 321 and the detection unit 322 such that a cycle illustrated in FIG. 4A is repeatedly performed. Here, each cycle includes a period in which the drive unit 321 causes only the LED 1 to emit the light and the detection unit 322 outputs an intensity signal A1 indicating the intensity of the infrared light incident on the PD 1 and an intensity signal E1 indicating the intensity of the infrared light incident on the PD 2, a period in which the drive unit 321 causes only the LED 2 to emit the light and the detection unit 322 outputs an intensity signal A2 indicating the intensity of the infrared light incident on the PD 1, a period in which the drive unit 321 causes only the LED 3 to emit the light and the detection unit 322 outputs an intensity signal A3 indicating the intensity of the infrared light incident on the PD 2, and a period in which the drive unit 321 causes only the LED 4 to emit the light and the detection unit 322 outputs an intensity signal A4 indicating the intensity of the infrared light incident on the PD 2 and an intensity signal E2 indicating the intensity of the infrared light incident on the PD 1.

Figure 4B:
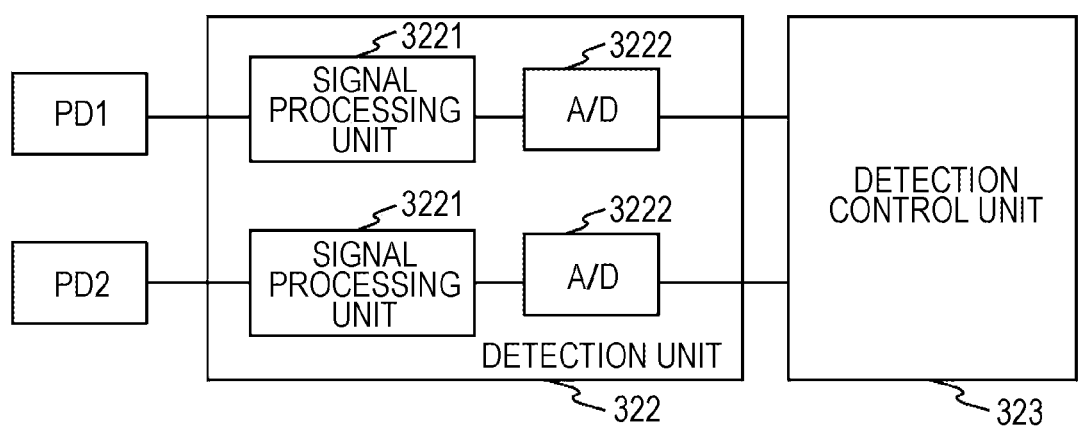

Next, FIG. 4B illustrates a configuration of the detection unit 322. As illustrated in this figure, the detection unit 322 includes a set of a signal processing unit 3221 and an analog-to-digital converter 3222 (A/D 3222) provided so as to correspond to each of the two photodiodes of the PD 1 and the PD 2.

The signal processing unit 3221 of each set performs signal processing such as conversion of the current signal output by the corresponding photodiode to a voltage signal, and the analog-to-digital converter 3222 of each set converts the current signal output by the signal processing unit 3221 of the same set into a digital signal and outputs the digital signal to the detection control unit 323.

Figure 5A:
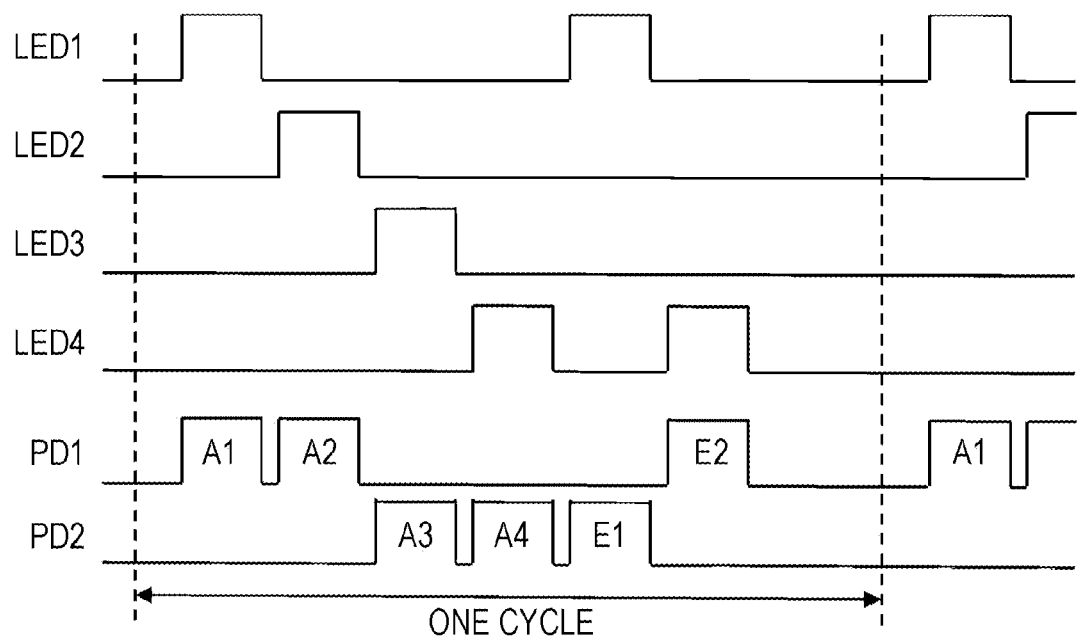
FIGS. 5A and 5B are diagrams illustrating another operation sequence of the proximity detection sensor according to the embodiment of the present invention.

Here, the detection control unit 323 of the proximity detection controller 32 may control the operations of the drive unit 321 and the detection unit 322 such that a cycle illustrated in FIG. 5A is repeatedly performed instead of the cycle illustrated in FIG. 4A.

The cycle illustrated in FIG. 5A includes a period in which the drive unit 321 causes only the LED 1 to emit the light and the detection unit 322 outputs an intensity signal A1 indicating the intensity of the infrared light incident on the PD 1, a period in which the drive unit 321 causes only the LED 2 to emit the light and the detection unit 322 outputs an intensity signal A2 indicating the intensity of the infrared light incident on the PD 1, a period in which the drive unit 321 causes only the LED 3 to emit the light and the detection unit 322 outputs an intensity signal A3 indicating the intensity of the infrared light incident on the PD 2, a period in which the drive unit 321 causes only the LED 4 to emit the light and the detection unit 322 outputs an intensity signal A4 indicating the intensity of the infrared light incident on the PD 2, a period in which the drive unit 321 causes only the LED 1 to emit the light and the detection unit 322 outputs an intensity signal E1 indicating the intensity of the infrared light incident on the PD 2, and a period in which the drive unit 321 causes only the LED 4 to emit the light and the detection unit 322 outputs an intensity signal E2 indicating the intensity of the infrared light incident on the PD 1.

Figure 5B:
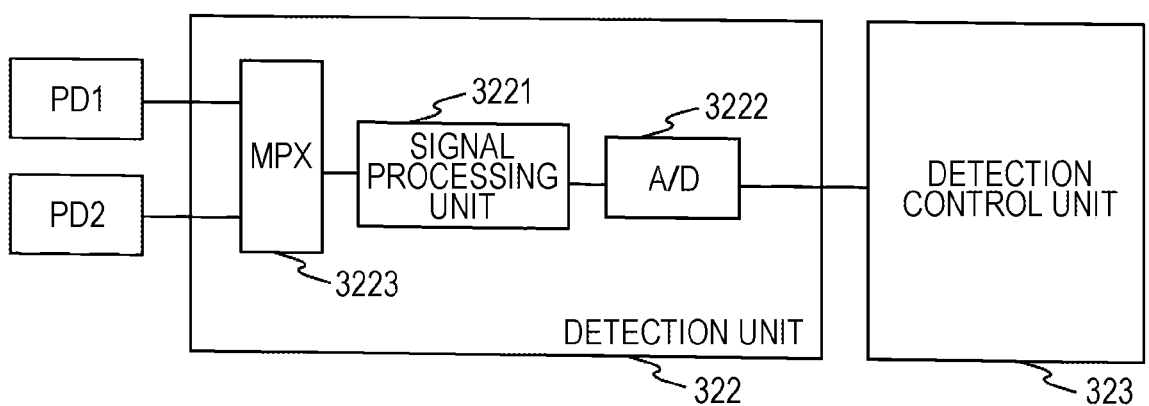

Here, when the detection control unit 323 of the proximity detection controller 32 controls the operations of the drive unit 321 and the detection unit 322 such that the cycle illustrated in FIG. 5A is repeatedly performed, the detection unit 322 has the configuration illustrated in FIG. 5B instead of the configuration illustrated in FIG. 4B.

In the configuration illustrated in FIG. 5B, the detection unit includes a multiplexer 3223 (MPX 3223), one signal processing unit 3221, and one analog-to-digital converter 3222. In the cycle illustrated in FIG. 5A, the multiplexer 3223 selects the current signal output by the PD 1 and outputs the current signal to the signal processing unit 3221 in the periods in which the detection unit 322 outputs the intensity signals A1, A2, and E2 indicating the intensities of the infrared light incident on the PD 1, and selects the current signal output by the PD 2 and outputs the current signal to the signal processing unit 3221 in the periods in which the detection unit 322 outputs the intensity signals A3, A4, and E1 indicating the intensities of the infrared light incident on the PD 2. The signal processing unit 3221 performs signal processing such as conversion of the current signal input from the multiplexer 3223 into a voltage signal, and the analog-to-digital converter 3222 converts the voltage signal output by the signal processing unit 3221 into a digital signal, and outputs the digital signal to the detection control unit 323.

Since the cycle illustrated in FIG. 5A does not include a period in which the intensity signal indicating the intensity of the infrared light incident on the PD 1 and the intensity signal indicating the intensity of the infrared light incident on the PD 2 are simultaneously acquired, in the cycle illustrated in FIG. 4A including a period in which the signals are simultaneously acquired, there is an advantage that the number of sets of the signal processing unit 3221 and the analog-to-digital converter 3222 which are required as two sets for the detection unit 322 as illustrated in FIG. 4B can be reduced to one set as illustrated in FIG. 5B.

In the cycles of FIGS. 4A and 5A, the intensity signal E1 indicating the intensity of the infrared light incident on the PD 2 when only the LED 1 emits the light has a large value in a case where the reflection occurs due to the hand of the user in a region A_E1 on an upper left side of the display 2 as illustrated in FIG. 6A1 compared to a case where the reflection occurs in another region.

This is because the region A_E1 on the upper left side of the display 2 is irradiated with the infrared light emitted by the LED 1 having a relatively strong intensity and a positional relationship between the LED 1, the PD 2, and the region A_E1 is a positional relationship in which the reflection light of the infrared light emitted by the LED 1 due to the reflection occurring in the region A_E1 reaches the PD 2 with a relatively strong intensity as illustrated in FIG. 6A1, whereas another region is a region irradiated with the infrared light having a relatively weak intensity emitted by the LED 1 or a region in which a positional relationship between the LED 1, the PD 2, and this region is a positional relationship in which the reflection light of the infrared light emitted by the LED 1 due to the reflection occurring in this region does not reach the PD 2 or reaches the PD 2 with a relatively weak intensity as illustrated in FIG. 6A2.

Similarly, in the cycles of FIGS. 4A and 5A, the intensity signal E2 indicating the intensity of the infrared light incident on the PD 1 when only the LED 4 emits the light has a large value in a case where the reflection occurs due to the hand of the user in a region A_E2 on an upper right side of the display 2 as illustrated in FIG. 6B compared to a case where the reflection occurs in another region.

Figure 7:
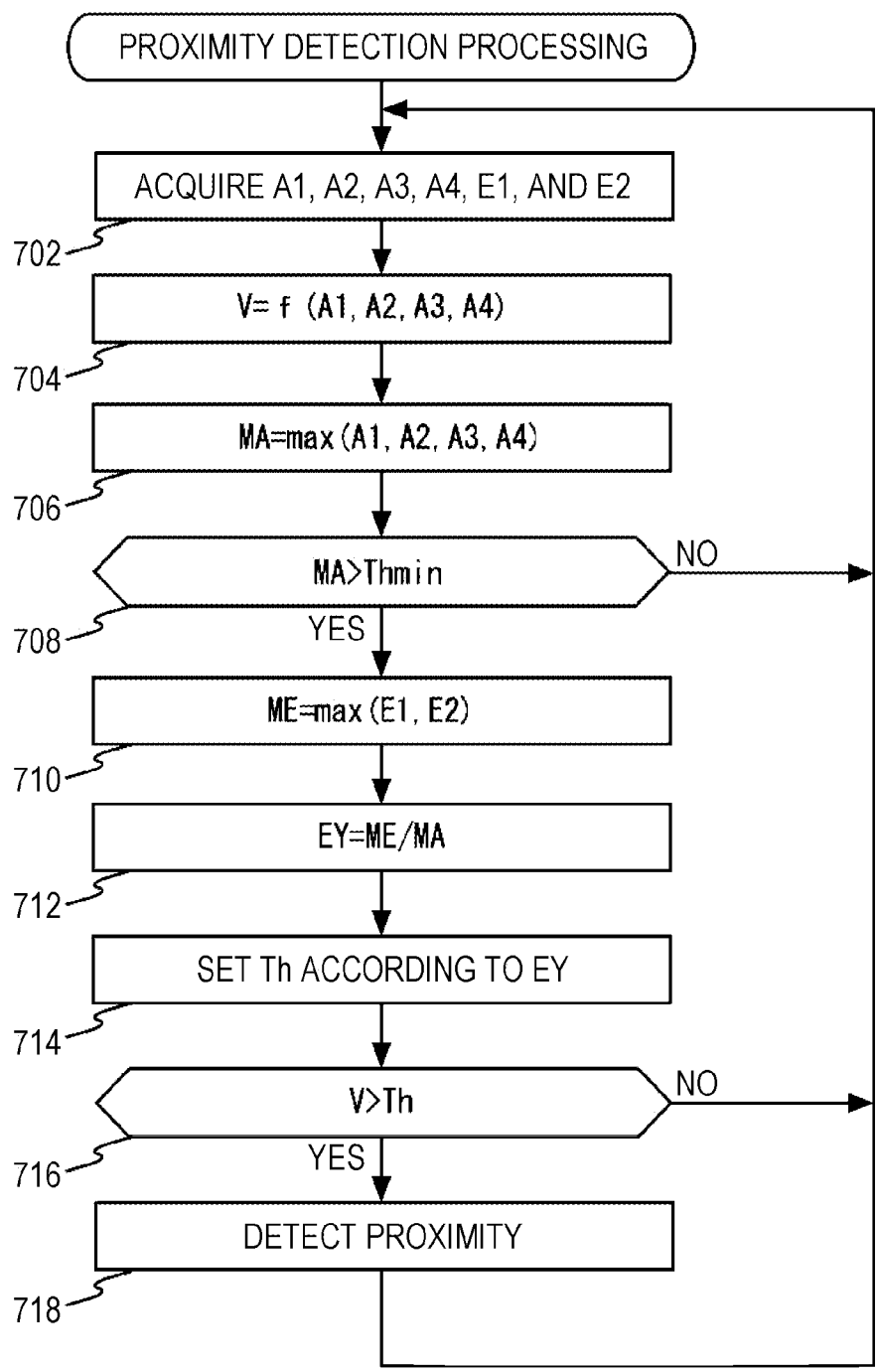
FIG. 7 is a flowchart illustrating proximity detection processing according to the embodiment of the present invention.

Accordingly, magnitudes of the intensity signals E1 and E2 are indicators of whether or not the hand of the user is positioned in the upper region of the display 2 (region A_E1 or region A_E2). Next, proximity detection processing performed by the detection control unit 323 of the proximity detection controller 32 will be described. FIG. 7 illustrates a procedure of this proximity detection processing. As illustrated in this figure, when the intensity signals A1, A2, A3, A4, E1, and E2 are acquired from the detection unit 322 in each cycle illustrated in FIG. 4A or FIG. 5A (step 702), the detection control unit 323 calculates an evaluation index V of the intensity signals A1, A2, A3, and A4 by V=f(A1, A2, A3, A4) by using a predetermined evaluation function f( ) (step 704). The evaluation function f( ) is a function that calculates a magnitude of reflection due to an object in the vicinity of the display surface in front of the display surface from the intensity signals A1, A2, A3, and A4. As an example, a function that calculates maximum values of the intensity signals A1, A2, A3, and A4, a linear combination function for A1, A2, A3, and A4 (a×A1+b×A2+c×A3+d×A4), and the like can be used as the evaluation function f( ).

The detection control unit calculates maximum values max (A1, A2, A3, A4) of the intensity signals A1, A2, A3, and A4 as MA (step 706), investigates whether or not MA exceeds a predetermined threshold value Thmin (step 708), returns the processing to step 702 as it is when the MA does not exceed the predetermined threshold value, and waits for the acquisition of the intensity signals A1, A2, A3, A4, E1, and E2 of the next cycle from the detection unit 322. A minimum value with which MA is acquirable when the reflection due to the hand of the user occurs in the vicinity of the display surface in front of the display surface of the display 2 is used as the threshold value Thmin.

Meanwhile, when MA exceeds the predetermined threshold value Thmin (step 708), the maximum values of the intensity signals E1 and E2 are calculated as ME (step 710). EY is calculated by EY=ME/MA (step 712), and a threshold value Th is adjusted according to a value of EY (step 714). In step 714, the threshold value Th is adjusted such that the threshold value Th becomes smaller when the EY is small than when the EY is large. More specifically, in step 714, for example, the threshold value Th is set to a first value when EY is smaller than a predetermined value, and the threshold value Th is set to a second value larger than the first value when EY is not smaller than the predetermined value. Alternatively, the threshold value Th is set so as to become small as EY becomes small.

The detection control unit compares V calculated in step 704 with the threshold value Th (step 716), returns the processing to step 702 when V is not larger than the threshold value Th, and waits for the acquisition of the intensity signals A1, A2, A3, A4, E1, and E2 from the detection unit 322.

Meanwhile, when the evaluation index V is larger than the threshold value Th, the detection control unit detects the approach of the hand of the user to the display surface of the display 2, and notifies the data processing device 1 of the approach of the hand of the user (step 718).

The detection control unit returns the processing to step 702, and waits for the acquisition of the intensity signals A1, A2, A3, A4, E1, and E2 of the next cycle from the detection unit 322. The proximity detection processing performed by the detection control unit 323 has been described above. Here, as described above, E1 and E2 have relatively large values when the reflection due to the hand of the user occurs in the upper region of the display 2, and have relatively small values when the reflection due to the hand of the user occurs in a lower region of the display 2.

Meanwhile, the magnitude of MA indicates the magnitude of the reflection occurring due to the hand of the user in the vicinity of the display surface in front of the display surface of the display 2. Accordingly, when ME is smaller than MA, that is, when EY=ME/MA calculated in step 712 of the above-described proximity detection processing is small, it is possible to discriminate that the reflection due to the hand of the user occurs at a position not in the upper region of the display 2 but in the lower region of the display.

In step 714, the threshold value Th is adjusted such that the threshold value Th becomes small in a case where the EY is small compared to a case where EY is large, and thus, the approach of the hand of the user can be detected for the lower portion of the display 2 at which a region in which the irradiation intensity of the infrared light becomes weak is formed by using a smaller threshold value Th compared to a case where the hand of the user is positioned in the upper region of the display 2.

That is, since the approach of the hand of the user to the display surface of the display 2 can be detected in a form in which a detection sensitivity of the approach of the hand of the user to the lower portion of the display surface of the display 2 at which a region in which the irradiation intensity of the infrared light becomes weak is formed is higher than a detection sensitivity of the hand of the user to another portion of the display surface of the display 2, the approach of the hand of the user to the lower portion can also be satisfactorily detected for the lower portion of the display 2 at which the irradiation intensity of the infrared light becomes weak is formed. When the detection sensitivity of the hand of the user is uniformly increased for portions other than the lower portion of the display surface of the display 2, erroneous detection of the approach of the hand of the user to the display surface occurs even when the hand of the user is far from the display surface of the display 2. However, according to the present embodiment, the occurrence of such erroneous detection is suppressed.

Accordingly, the approach of the hand of the user can be satisfactorily detected in the entire region of the display surface of the display 2. Incidentally, although it has been described in the proximity detection processing that the maximum values of the intensity signals A1, A2, A3, and A4 are used as the evaluation index MA, another value may be used as the evaluation index MA as long as this value indicates degrees of the magnitudes of the reflection light detected in the PD 1 and the PD 2. Although it has been described in the proximity detection processing that the maximum values of the intensity signals E1 and E2 are used as the evaluation index ME, another value may be used as the evaluation index ME as long as this value indicates degrees of the magnitudes of the reflection light detected in the PD 2 when only the LED 1 is turned on and the magnitude of the reflection light detected in the PD 1 when only the LED 4 is turned on. Although it has been described in the proximity detection processing that ME/MA is used as EY, another value may be used as EY as long as this value is an index value having an approximate correlation with whether a detected object is present at an upper portion or a lower portion of a display region.

Although it has been described in the embodiment that four infrared LEDs of the LED 1, the LED 2, the LED 3, and the LED 4 and two photodiodes of the PD 1 and the PD 2 are used, the number of infrared LEDs may be four or more, and the photodiodes may be other than two.

However, in this case, for one or a plurality of relatively far infrared LEDs, the intensity signal detected by the photodiode relatively far from the turned-on infrared LED when the infrared LED is turned on is used in order to detect whether or not the hand of the user is positioned in the upper region of the display 2 instead of the intensity signals E1 and E2.

Figure 8A:
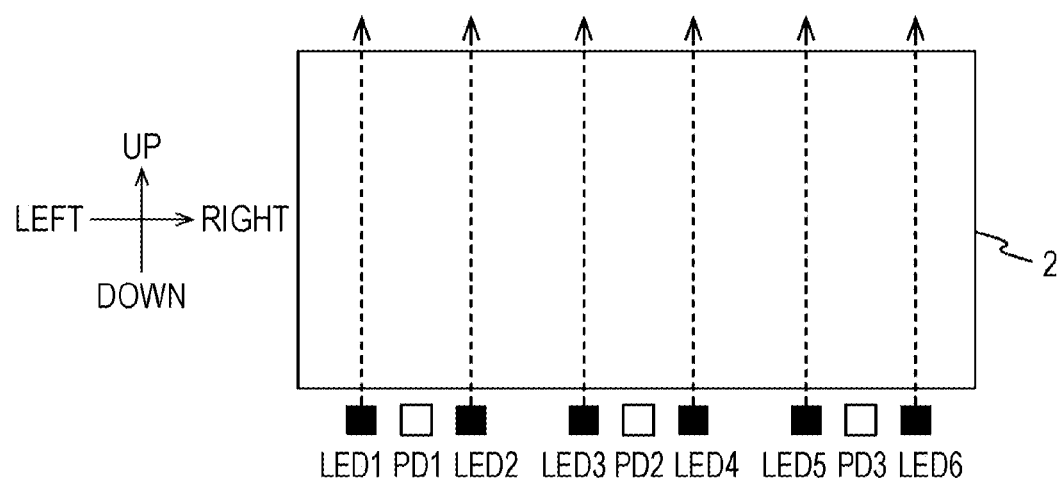
FIGS. 8A and 8B are diagrams illustrating another arrangement example of the proximity detection sensor according to the embodiment of the present invention.

That is, for example, as illustrated in FIG. 8A, when six infrared LEDs and three photodiodes of the LED 1, the PD 1, the LED 2, the LED 3, the PD 2, the LED 4, the LED 5, the PD 3, and the LED 6 are arranged from left to right in the described order, it is detected whether or not the hand of the user is positioned in the upper region of the display 2 according to the magnitude of the intensity signal detected by the PD 3 when only the LED 1 is turned on and the intensity signal detected by the PD 1 when only the LED 6 is turned on.

Alternatively, for example, it is detected whether or not the hand of the user is positioned in the upper region of the display 2 according to the magnitude of the intensity signal detected by the PD 2 when only the LED 1 is turned on and the intensity signal detected by the PD 2 when only the LED 6 is turned on.

Alternatively, for example, it is detected whether or not the hand of the user is positioned in the upper region of the display 2 according to the magnitudes of the intensity signal detected by the PD 1 when only the LED 4 or the LED 5 is turned on or the intensity signal detected by the PD 3 when only the LED 2 or the LED 3 is turned on.

Figure 8B:
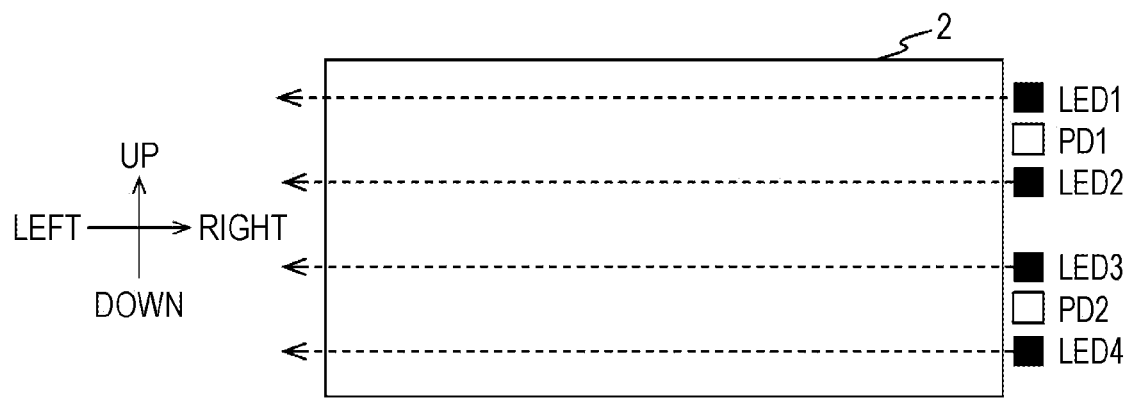

Although it has been descried in the embodiment that the plurality of infrared LEDs and the plurality of photodiodes are arranged at the position slightly below the lower side of the display 2, these LEDs and photodiodes may be arranged at a position slightly outside any side of the display 2. That is, for example, as illustrated in FIG. 8B, the four infrared LEDs of the LED 1, the LED 2, the LED 3, and the LED 4 and the two photodiodes of the PD 1 and the PD 2 may be arranged at a position slightly to the right of a right side of the display 2.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A proximity detection device that detects an approach of a user to a display surface of a display, the proximity detection device comprising:
    a plurality of infrared light sources that is arranged along a first side which is one side of the display surface outside the display surface of the display and emits infrared light passing through in front of the display surface;
    a plurality of photodetectors that is arranged along the first side outside the display surface;
    a proximity detection unit configured to detect the approach of the user to the display surface with a set sensitivity by using a first detection reflection intensity which is an intensity of reflection light of the infrared light emitted by each infrared light source and is detected by the photodetector positioned relatively close to the infrared light source that emits the infrared light; and
    a sensitivity setting unit configured to set, when only one infrared light source emits the infrared light, a sensitivity to the proximity detection unit such that the sensitivity becomes high in a case where the intensity of the reflection light detected by the photodetector positioned relatively far from the infrared light source and the first detection reflection intensity indicate that reflection occurs in a region close to the first side in front of the display surface compared to a case where the intensities do not indicate that the reflection occurs in the region.

2. A proximity detection device that detects an approach of a user to a display surface of a display, the proximity detection device comprising:
    a plurality of infrared light sources that is arranged along a first side which is one side of the display surface outside of the display surface of the display, and emits infrared light passing through in front of the display surface;
    a plurality of photodetectors that is arranged along the first side outside the display surface;
    a proximity detection unit configured to detect the approach of the user to the display surface when an intensity which is detected by the photodetector corresponding to the infrared light source according to a predetermined correspondence and is an intensity of reflection light of the infrared light emitted by the infrared light source is used as a first detection reflection intensity of emission light of the infrared light source for each of the plurality of infrared light sources and the intensity of the reflection light of the infrared light indicated by the first detection reflection intensity of the emission light of each infrared light source exceeds a set threshold value; and
    a threshold value setting unit configured to set a threshold value to the proximity detection unit such that the threshold value changes depending on an evaluation value calculated according to a predetermined evaluation function from each second detection reflection intensity and each first detection reflection intensity by using, as target infrared light sources, one or a plurality of infrared light sources of the plurality of infrared light sources and using, as second detection reflection intensities of emission light of the target infrared light sources, intensities which are intensities of reflection light of infrared light emitted by the target infrared light sources and are detected by the photodetectors further from the target infrared light sources than the photodetectors corresponding to the infrared light sources which are the target infrared light sources according to the correspondence for each target infrared light sources.

3. The proximity detection device according to claim 2, wherein the threshold value setting unit is configured to calculate, as the evaluation value, a ratio of a maximum value of each second detection reflection intensity to a maximum value of each first detection reflection intensity, and set the threshold value to the proximity detection unit such that the threshold value becomes small in a case where the calculated evaluation value is smaller than a predetermined level compared to a case where the evaluation value is not smaller than the predetermined level.

4. The proximity detection device according to claim 3, wherein the proximity detection unit is configured to detect the approach of the user to the display surface when the maximum value of each first detection reflection intensity exceeds the set threshold value.

5. The proximity detection device according to claim 2, wherein the threshold value setting unit is configured to calculate, as the evaluation value, a ratio of a maximum value of each second detection reflection intensity to a maximum value of each first detection reflection intensity, and set the threshold value to the proximity detection unit such that the threshold value becomes small as the calculated evaluation value becomes small.

6. The proximity detection device according to claim 5, wherein the proximity detection unit is configured to detect the approach of the user to the display surface when the maximum value of each first detection reflection intensity exceeds the set threshold value.

7. The proximity detection device according to claim 2, wherein the proximity detection unit is configured to detect the approach of the user to the display surface when a maximum value of each first detection reflection intensity exceeds the set threshold value.

8. A proximity detection device that detects an approach of a user to a display surface of a display, the proximity detection device comprising:
  a plurality of light sources that is arranged along a first side of the display surface and emits light passing in front of the display surface;
  a plurality of photodetectors that is arranged along the first side of the display surface and interleaved with the plurality of light sources;
  a proximity detection unit configured to detect the approach of the user to the display surface when an intensity which is detected by the photodetector corresponding to the light source according to a predetermined correspondence and is an intensity of reflection light of the light emitted by the light source is used as a first detection reflection intensity of emission light of the light source for each of the plurality of light sources and the intensity of the reflection light of the light indicated by the first detection reflection intensity of the emission light of each light source exceeds a set threshold value; and
  a threshold value setting unit configured to set a threshold value to the proximity detection unit such that the threshold value changes depending on an evaluation value calculated according to a predetermined evaluation function from each second detection reflection intensity and each first detection reflection intensity by using, as target light sources, one or a plurality of light sources of the plurality of light sources and using, as second detection reflection intensities of emission light of the target light sources, intensities which are intensities of reflection light of light emitted by the target light sources and are detected by the photodetectors further from the target light sources than the photodetectors corresponding to the light sources which are the target light sources according to the correspondence for each target light sources.

9. The proximity detection device according to claim 8, wherein the threshold value setting unit is configured to calculate, as the evaluation value, a ratio of a maximum value of each second detection reflection intensity to a maximum value of each first detection reflection intensity, and set the threshold value to the proximity detection unit such that the threshold value becomes small in a case where the calculated evaluation value is smaller than a predetermined level compared to a case where the evaluation value is not smaller than the predetermined level.

10. The proximity detection device according to claim 9, wherein the proximity detection unit is configured to detect the approach of the user to the display surface when the maximum value of each first detection reflection intensity exceeds the set threshold value.

11. The proximity detection device according to claim 8, wherein the threshold value setting unit is configured to calculate, as the evaluation value, a ratio of a maximum value of each second detection reflection intensity to a maximum value of each first detection reflection intensity, and set the threshold value to the proximity detection unit such that the threshold value becomes small as the calculated evaluation value becomes small.

12. The proximity detection device according to claim 11, wherein the proximity detection unit is configured to detect the approach of the user to the display surface when the maximum value of each first detection reflection intensity exceeds the set threshold value.

13. The proximity detection device according to claim 8, wherein the proximity detection unit is configured to detect the approach of the user to the display surface when a maximum value of each first detection reflection intensity exceeds the set threshold value.

* * * * *